Patented Oct. 3, 1922.

1,431,113

UNITED STATES PATENT OFFICE.

CHARLES E. HANSEN, OF PROVIDENCE, RHODE ISLAND.

COMPOSITION WHITE METAL.

No Drawing.  Application filed April 5, 1922. Serial No. 549,844.

*To all whom it may concern:*

Be it known that I, CHARLES E. HANSEN, a citizen of the United States, residing at Providence, in the county of Providence and State of Rhode Island, have invented a new and useful Composition White Metal, of which the following is a specification.

The object of the invention is the production of a white metal which is particularly adapted for use in arts as a base to which silver or other precious metals may be applied by electroplating, or plated on.

My composition metal is composed of copper, sixty-five (65) parts; nickel, nineteen and three-quarters (19¾) parts; zinc, thirteen and three-quarters (13¾) parts; tin, three-quarters (¾) of a part; and cobalt, three-quarters (¾) of a part.

In preparing the composition metal the metals forming the various parts are first reduced to a granular form, which are then fused or melted together in such manner as to cause a uniform blending of the various materials composing the white metal. The fused or melted composition may then be cast in ingot or other form as may be desired.

Having thus described my invention, what I claim as new and desire to secure by Letters Patent is:—

I claim:

The composition white metal composed of copper, nickel, zinc, tin, and cobalt, in substantially the proportions herein described.

In testimony whereof I have signed my name to this specification in the presence of two subscribing witnesses.

CHARLES E. HANSEN.

Witnesses:
 M. A. KINGSLEY,
 J. A. MILLER.